United States Patent
Chen et al.

(10) Patent No.: US 10,762,676 B2
(45) Date of Patent: *Sep. 1, 2020

(54) PROACTIVE CREATION OF PERSONALIZED PRODUCTS

(71) Applicant: Shutterfly, Inc., Redwood City, CA (US)

(72) Inventors: Eugene Chen, Belmont, CA (US);
Preeti Nathan, San Carlos, CA (US);
Trynne Anne Miller, San Francisco, CA (US); Wiley H. Wang, Pacifica, CA (US); Shay Litvak, Palo Alto, CA (US); Marco Santini, Oakland, CA (US); Chris M. Denend, Menlo Park, CA (US); Abhishek KiranKumar Sabbarwal, Sunnyvale, CA (US);
David Le, San Jose, CA (US); Ira Blas, Fremont, CA (US); Ryan Lee, Foster City, CA (US)

(73) Assignee: Shutterfly, LLC, Redwood City, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 15/810,718

(22) Filed: Nov. 13, 2017

(65) Prior Publication Data
US 2018/0068479 A1 Mar. 8, 2018

Related U.S. Application Data

(63) Continuation of application No. 15/405,077, filed on Jan. 12, 2017, now Pat. No. 9,846,957, which is a
(Continued)

(51) Int. Cl.
*G06K 9/32* (2006.01)
*G06T 11/60* (2006.01)
(Continued)

(52) U.S. Cl.
CPC .......... *G06T 11/60* (2013.01); *G06F 3/04842* (2013.01); *G06F 3/1204* (2013.01);
(Continued)

(58) Field of Classification Search
None
See application file for complete search history.

(56) References Cited

U.S. PATENT DOCUMENTS 9,244,941 B2 * 1/2016 Chen ..................... G06F 3/1252
9,846,957 B2 * 12/2017 Chen ..................... G10L 15/26
(Continued)

*Primary Examiner* — Iman K Kholdebarin
(74) *Attorney, Agent, or Firm* — Xin Wen

(57) ABSTRACT

A method for proactively creating an image product includes capturing an image of an object in a first environment by a device, storing a library of personalized products each characterized by a product type, automatically recognizing the object in the image as having a product type associated with the library of personalized products, automatically creating a design for the personalized product of the product type using personalized content, automatically displaying the design of the personalized product of the product type incorporating the selected photo in the first environment on the device, and manufacturing a physical product based on the design of the personalized product.

16 Claims, 13 Drawing Sheets

Related U.S. Application Data continuation-in-part of application No. 14/990,402, filed on Jan. 7, 2016, now Pat. No. 9,549,085, which is a continuation of application No. 14/102,091, filed on Dec. 10, 2013, now Pat. No. 9,244,941, which is a continuation-in-part of application No. 13/867,444, filed on Apr. 22, 2013, now Pat. No. 8,655,105, which is a continuation of application No. 12/821,369, filed on Jun. 23, 2010, now Pat. No. 8,437,575.

(51) Int. Cl.

| | | |
|---|---|---|
| *G10L 15/22* | (2006.01) | |
| *G10L 15/26* | (2006.01) | |
| *G06F 3/12* | (2006.01) | |
| *H04N 1/00* | (2006.01) | |
| *H04N 1/32* | (2006.01) | |
| *G06F 3/0484* | (2013.01) | |
| *G06F 16/583* | (2019.01) | |
| *G06F 16/51* | (2019.01) | |
| *G06F 16/50* | (2019.01) | |
| *G06F 40/284* | (2020.01) | |
| *H04N 101/00* | (2006.01) | |

(52) U.S. Cl.
CPC .......... *G06F 3/1208* (2013.01); *G06F 3/1256* (2013.01); *G06F 3/1287* (2013.01); *G06F 16/50* (2019.01); *G06F 16/51* (2019.01); *G06F 16/5838* (2019.01); *G06F 16/5854* (2019.01); *G06F 40/284* (2020.01); *G10L 15/22* (2013.01); *G10L 15/26* (2013.01); *H04N 1/00132* (2013.01); *H04N 1/00161* (2013.01); *H04N 1/00167* (2013.01); *H04N 1/00196* (2013.01); *H04N 1/00442* (2013.01); *H04N 1/00453* (2013.01); *H04N 1/00456* (2013.01); *H04N 1/00458* (2013.01); *H04N 1/00461* (2013.01); *H04N 1/00464* (2013.01); *H04N 1/32512* (2013.01); *H04N 1/32571* (2013.01); *H04N 1/32577* (2013.01); *H04N 1/32582* (2013.01); *H04N 1/32587* (2013.01); *H04N 2101/00* (2013.01)

(56) References Cited

U.S. PATENT DOCUMENTS

| | | | |
|---|---|---|---|
| 2014/0101152 A1* | 4/2014 | Chen | ............... G06F 16/50 707/736 |
| 2017/0124750 A1* | 5/2017 | Chen | ............... H04N 1/32571 |
| 2018/0068479 A1* | 3/2018 | Chen | ............... G06F 40/284 |

* cited by examiner

US 10,762,676 B2

PROACTIVE CREATION OF PERSONALIZED PRODUCTS

TECHNICAL FIELD

This application relates to utilization of digital images, and more specifically, to the design and the creation of products based on digital images.

BACKGROUND OF THE INVENTION

In recent years, photography has been rapidly transformed from chemical based technologies to digital imaging technologies. Images captured by digital cameras and mobile phones can be stored in computers and cloud storage. Users can view, edit, and print the digital images. The image prints can be generated locally using output devices such an inkjet printer or a dye sublimation printer or remotely by a photo printing service provider. Examples of other image-based products include photo books, photo calendars, photo mug, photo T-shirt, and so on. A photo book can include a cover page and a plurality of image pages each containing one or more images. Designing an image-based product such as a photobook can include many iterative steps such as selecting suitable images, selecting layout, selecting images for each page, selecting backgrounds, picture frames, overall Style, add text, choose text font, and rearrange the pages, images and text, which can be quite time consuming. It is desirable to provide methods to allow users to create image-based or personalized products in a time efficient manner.

SUMMARY OF THE INVENTION

The disclosed methods and systems can significant increase the awareness in personalized image products such as photobooks. Personalized products or image-based products using user images are proactively presented to users, which allow the users to visualize what such products might look like before they are manufactured. The memories of the users can thus be better preserved in more colorful and tangible ways.

Furthermore, the disclosed systems and methods provide convenient ways for users to obtain designs of image products such as photo books. Images in a group can be automatically arranged into an image product design without being asked by a user. The user is provided with an option to review, to edit, and to request a physical copy of the image product to be made according to the design. As a result, the time and effort for a user to create and obtain an image product are significantly reduced.

In one general aspect, the present invention relates to a method for method for proactively creating an image product. The method includes storing a library of specification terms for image products by a computer system, receiving a voice message from a user, converting the voice message into a text form by the computer system, conducting lexical analysis of the text, tokenizing the text into a plurality of tokens by the computer system, matching one or more of the tokens to the specification terms in the library to determine specification parameters for an image product by the computer system, automatically identifying images based on the specification parameters by the computer system, and automatically creating, by the computer system, a design for the image product that incorporates at least some of the images identified based on the specification parameters. Implementations of the system may include one or more of the following the specification terms in the library specify one or more image sources from which the images are to be obtained, wherein one or more of the tokens are matched to the specification terms in the library that specify the one or more image sources, Implementations of the system may include one or more of the following. The step of automatically identifying can include identifying images at the one or more image sources. The specification terms in the library specify one or more persons, wherein one or more of the tokens can be matched to the specification terms in the library that specify one or more persons, wherein the step of automatically identifying can include identifying images that include the one or more persons in the images. The specification terms in the library specify an occasion that the images can be associated with, wherein one or more of the tokens are matched to the specification terms in the library that specify an occasion, wherein the step of automatically identifying can include identifying images that are associated with the occasion. The specification terms in the library can specify a time period in which the images are taken, wherein one or more of the tokens can be matched to one or more specification terms in the library that specify a time period in which the images are taken, wherein the step of automatically identifying comprises identifying images that are taken in the time period. The specification terms in the library can specify one or more image product types, wherein one or more of the tokens are matched to at least one specification term in the library that specifies an image product type, wherein the design for the image product can be automatically created in the image product type. The method can further include selecting a subset of the identified images, wherein a number of the identified images in the subset can be within a predetermined range compatible with the image product type. The specification terms in the library can specify a style or a format for an image product, wherein one or more of the tokens are matched to at least one specification term in the library that specifies a style or a format for an image product, wherein the design for the image product is automatically created in the style or the format. The method can further include manufacturing a physical manifestation of the image product based on the design for the image product. The specification terms in the library can specify a recipient for an image product, wherein one or more of the tokens can be matched to a specification term in the library that specifies a recipient for an image product, wherein the physical manifestation of the image product can be sent to the recipient after the step of manufacturing. The method can further include ranking the identified images using predetermined criteria; and selecting a subset of the identified images based on a result of the ranking step, wherein the design for the image product incorporates the subset of the identified images. The method can further include after the step of matching, presenting a question to the user by the computer system; receiving an answer from the user; tokenizing the answer into a plurality of tokens by the computer system; and matching one or more of the tokens to the specification terms in the library to determine additional specification parameters for an image product by the computer system. The step of automatically creating can include assigning at least a portion of the identified images into a first page group and a second page group each comprising one or more images; placing the first page group of one or more images in the first page of the image product; and placing the second page group of one or more images in the second page of the image product. The step of conducting lexical analysis of the text can include conducting parsing or syntactic analysis of the text by the compute system. The step of tokenizing can include parsing the text. The step of matching can include matching the one or more of the tokens to morphological variations of the specification terms in the library to determine specification parameters for an image product by the computer system.

In another general aspect, the present invention relates to a method for proactively creating an image product. The method includes storing a library of specification terms for image products by a computer system; receiving a command from a user; tokenizing the command into a plurality of tokens by the computer system; matching one or more of the tokens to the specification terms in the library to determine specification parameters for an image product by the computer system; automatically identifying images based on the specification parameters by the computer system; and automatically creating, by the computer system, a design for the image product that incorporates at least some of the images identified based on the specification parameters.

Implementations of the system may include one or more of the following. The specification terms in the library can specify one or more image sources from which the images are to be obtained, wherein one or more of the tokens can be matched to the specification terms in the library that specify the one or more image sources, wherein the step of automatically identifying can include identifying images at the one or more image sources. The specification terms in the library can specify one or more persons, wherein one or more of the tokens are matched to the specification terms in the library that specify one or more persons, wherein the step of automatically identifying can include identifying images that include the one or more persons in the images. The specification terms in the library can specify an occasion that the images are associated with, wherein one or more of the tokens are matched to the specification terms in the library that specify an occasion, wherein the step of automatically identifying can include identifying images that are associated with the occasion. The specification terms in the library can specify a time period in which the images are taken, wherein one or more of the tokens are matched to one or more specification terms in the library that specify a time period in which the images are taken, wherein the step of automatically identifying can include identifying images that are taken in the time period. The specification terms in the library can specify one or more image product types, wherein one or more of the tokens are matched to at least one specification term in the library that specifies an image product type, wherein the design for the image product is automatically created in the image product type. The method can further include selecting a subset of the identified images, wherein a number of the identified images in the subset is within a predetermined range compatible with the image product type. The specification terms in the library can specify a style or a format for an image product, wherein one or more of the tokens are matched to at least one specification term in the library that specifies a style or a format for an image product, wherein the design for the image product is automatically created in the style or the format. The method can further include manufacturing a physical manifestation of the image product based on the design for the image product. The specification terms in the library can specify a recipient for an image product, wherein one or more of the tokens are matched to a specification term in the library that specifies a recipient for an image product, wherein the physical manifestation of the image product is sent to the recipient after the step of manufacturing. The method can further include ranking the identified images using predetermined criteria; and selecting a subset of the identified images based on a result of the ranking step, wherein the design for the image product can incorporate the subset of the identified images. The method can further include after the step of matching, presenting a question to the user by the computer system; receiving an answer from the user; tokenizing the answer into a plurality of tokens by the computer system; and matching one or more of the tokens to the specification terms in the library to determine additional specification parameters for an image product by the computer system. The step of automatically creating can include: assigning at least a portion of the identified images into a first page group and a second page group each comprising one or more images; placing the first page group of one or more images in the first page of the image product; and placing the second page group of one or more images in the second page of the image product. The step of receiving a command can include receiving a text form the user, wherein the text is tokenized by the computer system. The step of receiving a command can include receiving a voice message from the user; and recognizing a text in the voice message, wherein the text is tokenized by the computer system. The step of tokenizing can include parsing the command. The step of matching can include matching the one or more of the tokens to morphological variations of the specification terms in the library to determine specification parameters for an image product by the computer system.

In another general aspect, the present invention relates to a method for proactively creating a photobook. The method includes identifying a group of images by a computer system; automatically creating a design for an image product by the computer system without receiving a user's request for designing the image product if the number of images in the group is determined to be within a predetermined range, wherein the image product incorporates one or more images in the group; presenting the design of the image product to a user for preview; and receiving an order from the user for a physical manifestation of the image product based on the design.

Implementations of the system may include one or more of the following. The group of images can be received in an upload from a computer device to the computer system. The group of images can be formed in an electronic share from a first user to a second user. The group of images can be clustered when they are selected for printing. The group of images can be clustered when the images are placed in an electronic folder or an electronic album. The group of images can be tagged by a common label. The method can further include automatically selecting a format or a style for the design of the photobook before the step of automatically creating a design for a photobook by a computer system. The method can further include determining if the number of images in the group is determined to be within a predetermined range, wherein the predetermined range varies depending on if the group of the images is clustered in an upload from a computer device to the computer system, or when the images are selected for printing, or when the images are placed in an electronic folder or an electronic album, or when the images are placed in an electronic folder or an electronic album, or the images are tagged by a common label. The image product comprises a plurality of pages. The step of automatically creating a design for an image product can further includes: assigning at least a portion of the plurality of images into a first page group and a second page group each comprising one or more images; placing the first page group of one or more images in the first page of the image product; and placing the second page group of one or more images in the second page of the image product. The step of automatically creating a design for an image product can further includes: automatically selecting a first page layout from a library of page layouts, wherein the first page group of one or more images are placed in the first page according to the first page layout; and automatically selecting a second page layout from the library of page layouts, wherein the second page group of one or more images are placed in the second page according to the second page layout. The method can further include allowing the user to select the format or the style for the design of the image product after the step of presenting the design of the image product. The method can further include making the physical manifestation of the image product in accordance to the design. The step of presenting the design of the image product to a user for preview can include sending an email message to the user to present the design of the image product. The image product can include multiple pages that each is configured to display one or more images in the group of images. The image product can include a single page that is configured to display one or more images in the group of images.

In another general aspect, the present invention relates to a method for proactively creating a photobook. The method includes identifying a group of images by a computer system; automatically selecting a format and a style for an image product by the computer system if the number of images in the group is determined to be within a predetermined range; automatically creating a design for the image product in the selected format and the style by the computer system without receiving a user's request for designing an image product using the group of images, wherein pages of the image product incorporates one or more images in the group; presenting the design of the image product to a user for preview; and receiving an order from the user for a physical manifestation of the image product based on the design.

In another general aspect, the present invention relates to a method for proactively creating a photobook. The method includes identifying a group of images by a computer system; automatically creating a design for an image product by the computer system without receiving a user's request for designing the image product incorporating one or more images in the group if the number of images in the group is determined to be within a predetermined range; presenting the first design of the image product to a user for preview; detecting a change in the group of images; automatically modifying the first design of image product to create a second design for the image product in response to the change in the group of images; and presenting the second design of the image product to a user for preview.

Implementations of the system may include one or more of the following. The change in the group of images can include addition to the group of images or removal of images from the group of images. The change in the group of images can include a change in an image property of the group of images. The image property can include a tag, a keyword, a title of a folder where the images are placed, or metadata at least one of the images.

BRIEF DESCRIPTIONS OF THE DRAWINGS

The accompanying drawing, which are incorporated in and form a part of this specification, illustrate embodiments of the invention and, together with the description, serve to explain the principles of the invention:

DETAILED DESCRIPTION OF THE INVENTION

In the present invention, the term "photo album" refers to a book that includes one or two cover pages and one or more image pages. Each of the image pages can include one or more images. The image pages can also include text or image caption. The image layout can also include a background pattern. In the imaging industry, photo albums can include photo books, scrapbooks, snap books, and any books form including bound image pages.

Figure 1:
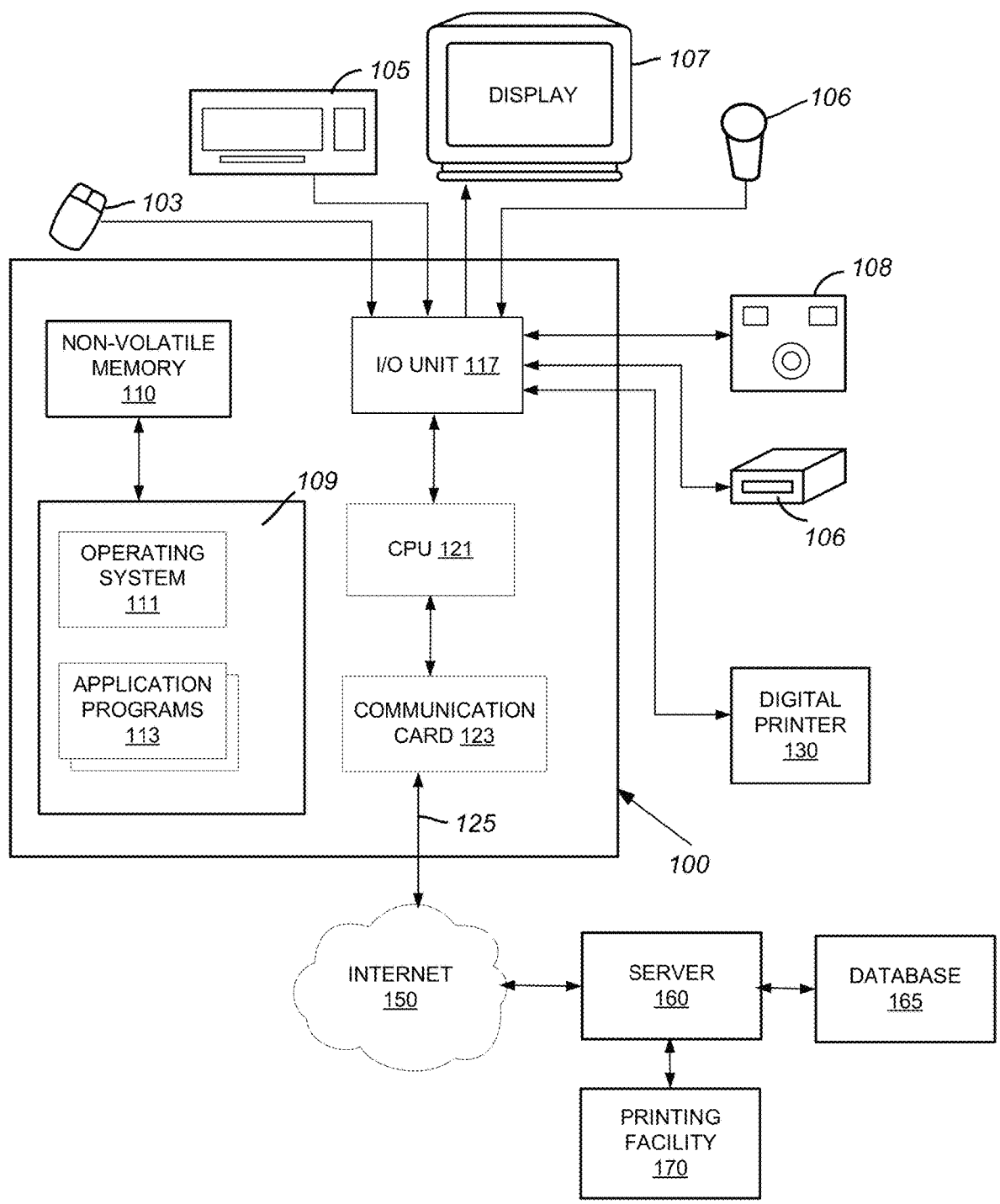
FIG. 1 is a block diagram of a system for imaging applications compatible with the present invention.

A computer 100 illustrated in FIG. 1 represents an exemplified hardware setup for executing software that allows a user to perform tasks such as communicating with other computer users, accessing various computer resources, and viewing, creating, or otherwise manipulating electronic content, that is, any combination of text, images, movies, music or other sounds, animations, 3D virtual worlds, and links to other objects. The system includes various input/output (I/O) devices (a mouse 103, a keyboard 105, a microphone 106, and a display 107) and a computer 100 having a central processor unit (CPU) 121, an I/O unit 117 and a memory 109 that stores data and various programs such as an operating system 111, and one or more application programs 113. The computer 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 such as a cable modem, DSL service or wireless Internet connection. The computer 100 of FIG. 1 also can be connected to various peripheral I/O devices. One of the more popular of such peripheral devices is a digital camera 108. The digital camera 108 enables users to take pictures (i.e., images), which are saved in memory within the digital camera 108 in a digital format. After taking and storing the images, the user can connect the digital camera 108 to a computer 100 in order to upload the digital images to the computer's disk drive or other non-volatile memory 110. The user can also wirelessly transfer digital images in the digital camera to the computer 100. Once the digital images are uploaded to the computer 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110. Once the digital images are stored on the computer 100, a user can perform various operations on them. For example, an image viewer application can be used to view the images. A photo editing application can also be used to touch-up or otherwise modify the images. The computer 100 can communicate via Internet 150 with a server 160 provided by a service provider, such as Shutterfly, Inc. A user operating the computer 100 can upload or download images between the computer and the server 160. The user can also electronically share his or her images facilitated by the service provider. The server 160 can be in communication with a database 165 that is also operated by the service provider. The database 165 can store account information, and product design, product creation and product order information in association with the user.

It should be noted that the computer 100 can exist in other configurations from the example shown in FIG. 1 and described above. The computer can include a mobile device such as a smart phone, a digital assistant device, and a wireless enabled mobile computer such as a laptop computer or a tablet computer, Although large numbers of images are frequently captured by digital cameras and mobile phones, people often are not aware of the customized image products that are available from image service providers such as Shutterfly Inc. Customizable image products or personalized product include photobooks, photo calendars, personalized greeting cards, photo stationeries, photo mugs, photo T-shirt, photo or image prints, photo posters, photo banners, photo playing cards, photo aprons, or magnets, mouse pads, phone cases, cases for tablet computers, key-chains, photo collectors, coasters, banners, or other types of photo gifts that include personalized content. Other examples of personalized products include glassware, tiles, woodwork, jewelry trays, paperweights, pillows, and mugs that include customizable graphic designs, text, or images. These personalized products provide tangible ways for preserving people's treasured memories in addition to viewing images on electronic displays.

Additionally, significant obstacles exist even for people who are aware of the availability of customizable image products. The design of a photobook, for example, can take significant amount of time and effort. A user has to select a large number of quality and emotionally significant photos, increasing from different sources, such as, a local computer or phone, at a data storage operated by the service provider, or at a third party social site (e.g. Facebook™, Instagram™ . . . ). The user needs to select a format, and a style for the photobook. The user needs to design or select layout for each page including a cover page, sort images in different page groups, and place the images onto individual pages. The photobook design can take many iterative steps such as selecting suitable images, selecting layout, selecting images for each page, add text, which can often take hours to complete.

Once the user approves a design for an image product, the image product (e.g. a photobook) can be made according to the design locally by a printer 130 connected to the computer 100, or remotely by the imaging service provider at a printing facility 170.

It should be understood that the presently disclosed systems and methods are suitable for proactively creating different image products other than photobooks. The image products can include multiple pages (i.e. faces or views) that each can display one or more images, such as, photo books, photo calendars, photo scrapbooks, photo snapbooks, photo calendars, photo albums, a multi-face photo card. The image products can also include a single page or view for displaying one or more images, which can include, for example, photo greeting cards, photo calendars, holiday cards, photo mugs, photo T-shirts, photo aprons, single photo pages, photo collage pages, a photo stationery, photo banners, photo mugs, photo mouse pads, photo key-chains, photo collectors, and photo coasters etc.

Figure 2:
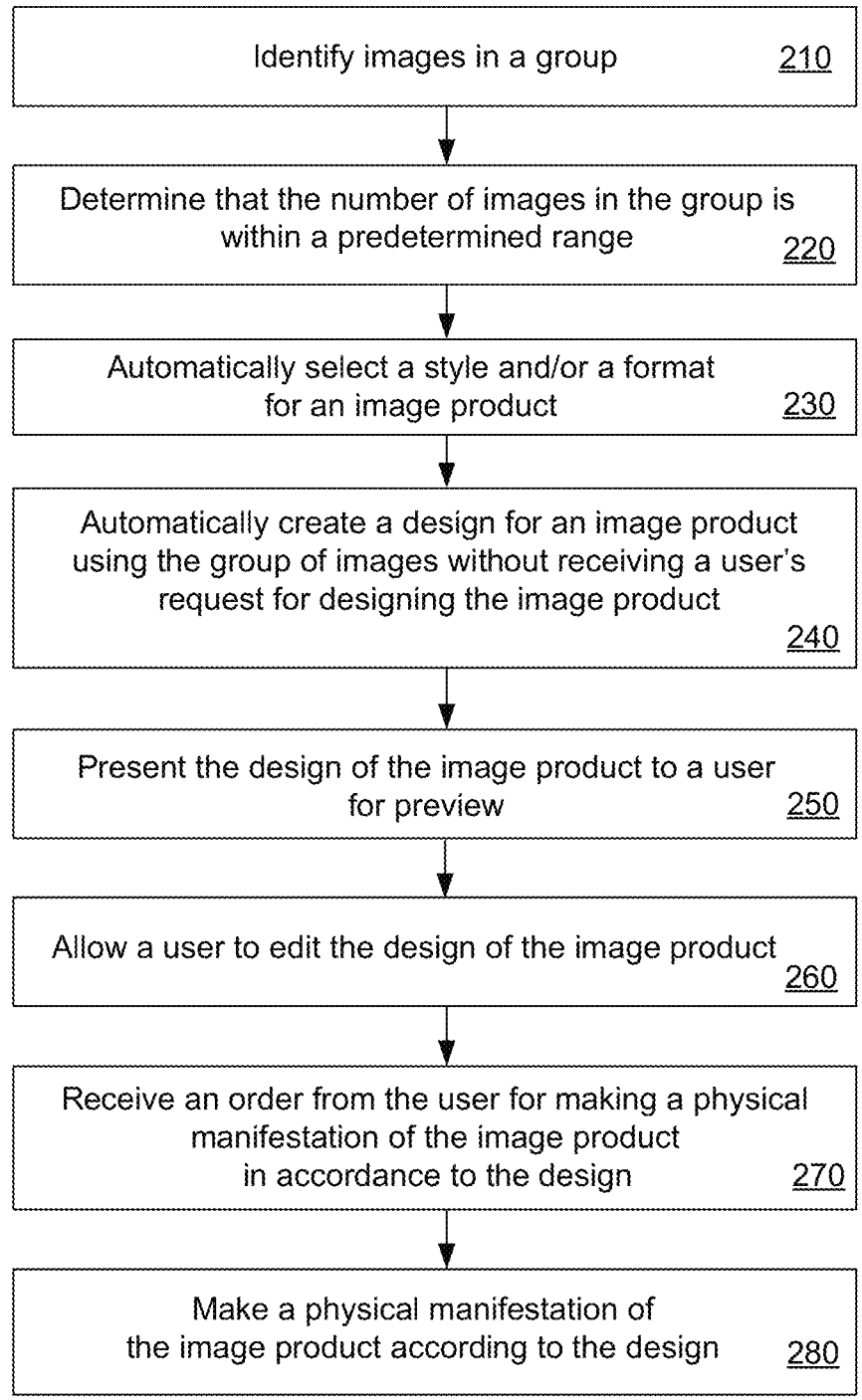
FIG. 2 shows a flow chart for proactively creating a photobook in accordance to the present invention.

In some embodiments, referring to FIG. 2, an image product can be made available to a user in the following process. It should be noted that the process can include substeps within each step and other steps not shown in FIG. 2. Additionally, certain steps in the process may be optional.

Figure 3:
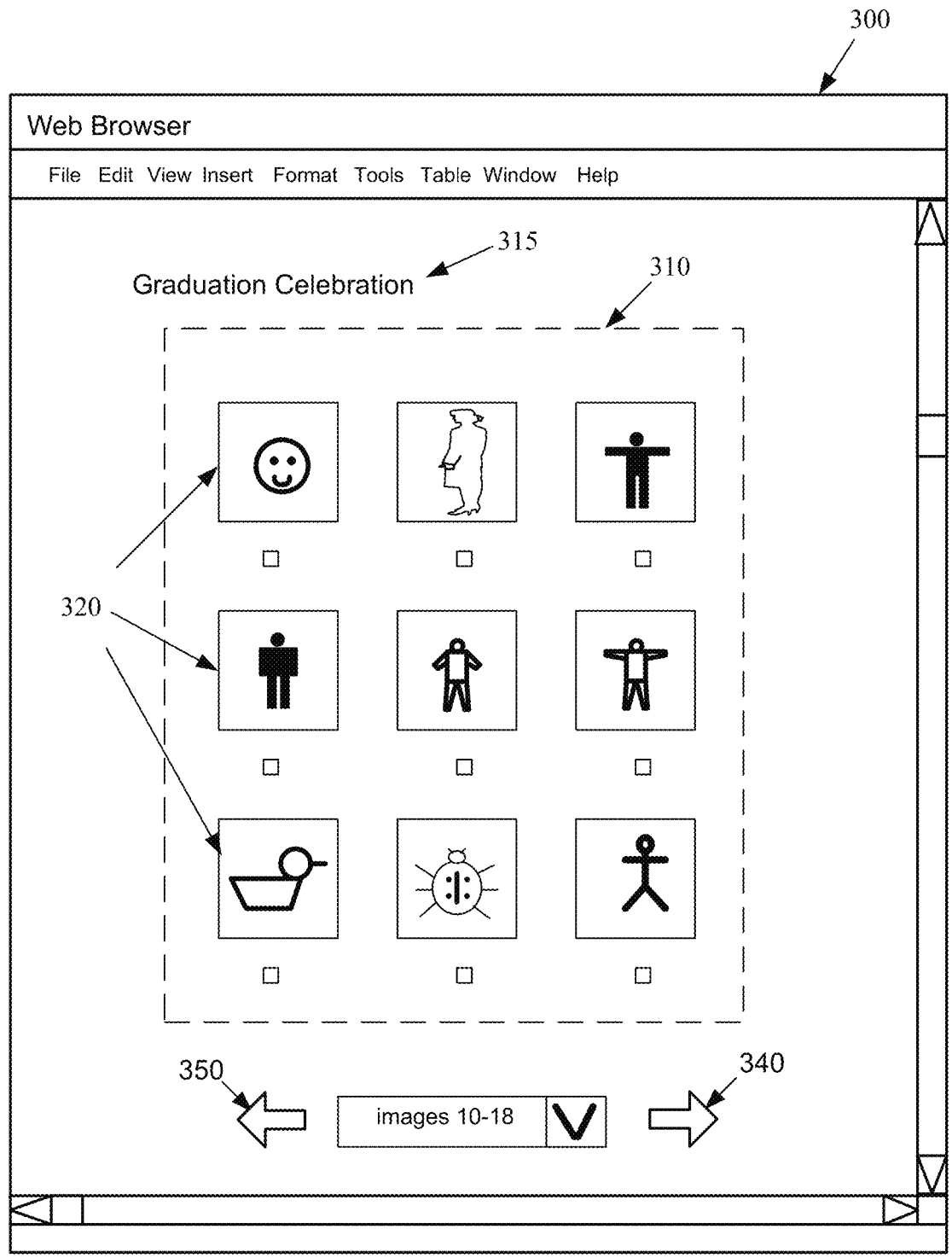
FIG. 3 is an exemplified user interface showing an image album having a plurality of images.

A group of images is identified by a computer system such as the computer 100 or the server 170 (step 210). The images can be received in a group in an upload from a computer device (e.g. the computer 100, FIG. 1) to the computer system (e.g. the server 170, FIG. 1), or from a digital camera to a computer (e.g. the computer 100, FIG. 1). The images can form a group when the images are shared in an electronic message from a first user (e.g. operating the computer 100, FIG. 1) to a second user via a computer server (e.g. the server 170, FIG. 1). The images can be identified when a group of images is selected for printing. The images can also be identified when the images are placed in an electronic folder or an electronic album for an occasion or event, or simply for collecting pictures of a theme or interest (which can be called "a picture picker"). As shown in FIG. 3, a user interface 300 (e.g. a web browser) displays an image album 310 that can have an album name 315 such as "Graduation Celebration" and a plurality of images 320. The image album 310 can include several pages of images that a user can navigate to and view by clicking arrow buttons 340, 350. Furthermore, images may be tagged by a user or the service provider by labeled such as "Hawaiian Vacation", "Soccer Team", "Birthday Party", "Favorite", etc. A group of images can be identified when they are tagged by a common label such as "Hawaiian Vacation".

The computer system then determines if the number of images is within a predetermined range (step 220). For example, the threshold for the number of images in the group can be 20 (i.e. the predetermined range is 20 or higher). If the images in the group are within the predetermined range, the computer system automatically selects a style and a format for an image product (step 230). For example, the styles of the image products can include, romance, seasonal, everyday, vacation, travel, wedding, baby, kids, birthday, school memories, sports, Mother's day, holiday, etc., each of which can include more detailed styles. In the example of photobooks, the style of a photobook can specify the theme of the photobook such as colors, the background, patterns and graphics laid on the page, picture borders, the text font, positions of the text, and the images on the covers of the photobook. The format of a photobook can include the size e.g. 5"×7", 8"×8", 12"×12" etc.), the paper stock materials for the pages and the cover, the type of binding, and the finish of the photobook.

In some embodiments, the predetermined range can depend on how the group of images is selected, whether they are selected for printing, or for electronic share, or placed in a single electronic folder or album, or received in an image upload, or tagged by a same label. For example, the threshold number can be 15 for the images that are selected for printing, and 20 for the images that are selected for electronic sharing. The different threshold image numbers for different image aggregation sources is based on the observation that users conducting different image operations often have different degrees of interests in seeing the design and making a physical image product such as a photobook. The above described flexibility in image threshold numbers can provide service best suitable to different segments of users.

In some embodiments, the predetermined range can depend on the type of image products. For example, a calendar book may require 12 different images for 12 months plus an extra image for the calendar cover. Since the calendar cover may use a redundant image from the months, there needs to be at least 12 images for a calendar book. Therefore the minimum number of images for a 12-month calendar book is 12. Similarly, the minimum number of images for an 18-month calendar book is 18. On the other hand, the design of a photo mug can be proactively prepared when there is at least one image in the group. A single-page photo collage may require a minimum of M×N images if the collage includes at least M rows and N columns, wherein M and N are positive integers.

The style and the format of the image product can have default selections. For example, a photobooks can have "everyday" and hardcover for a book style, and 8" by 8" for the photobook format. In some embodiments, the style and the format of the photobook can be selected based on knowledge of the images in the group. Specifically, an image property can be extracted from the group of identified images. For example, if the images are identified by a common tag label "Hawaii Vacation", a photobook style for vacation, or specifically for Hawaiian vacation, may be automatically selected. In another example, if the images identified are in an electronic album called "Molly's Birthday Party", a birthday photobook style can be automatically selected. In another example, the album name 315 (FIG. 3) in which the images (320, FIG. 3) are identified can be used to automatically select a photobook style (such as a "Graduation" photobook style).

The computer system automatically produces a design incorporating the identified images using the automatically selected style and format for the image product (step 240). It should be noted that the design of the image product using the group of identified images, and the associated selections of style and formats, are proactively and automatically implemented by the computer system without receiving a request from a user. The approach described in the present systems and methods is different from conventional processes for crating image products, which require users to initiate projects to design the image products. As described above, the conventional methods require awareness and familiarity of the image products by the users. The projects of creating image products such as photobooks can be very time consuming. A lot of time must be committed by a user without her knowing how an image product could look like at the end.

Figure 4:
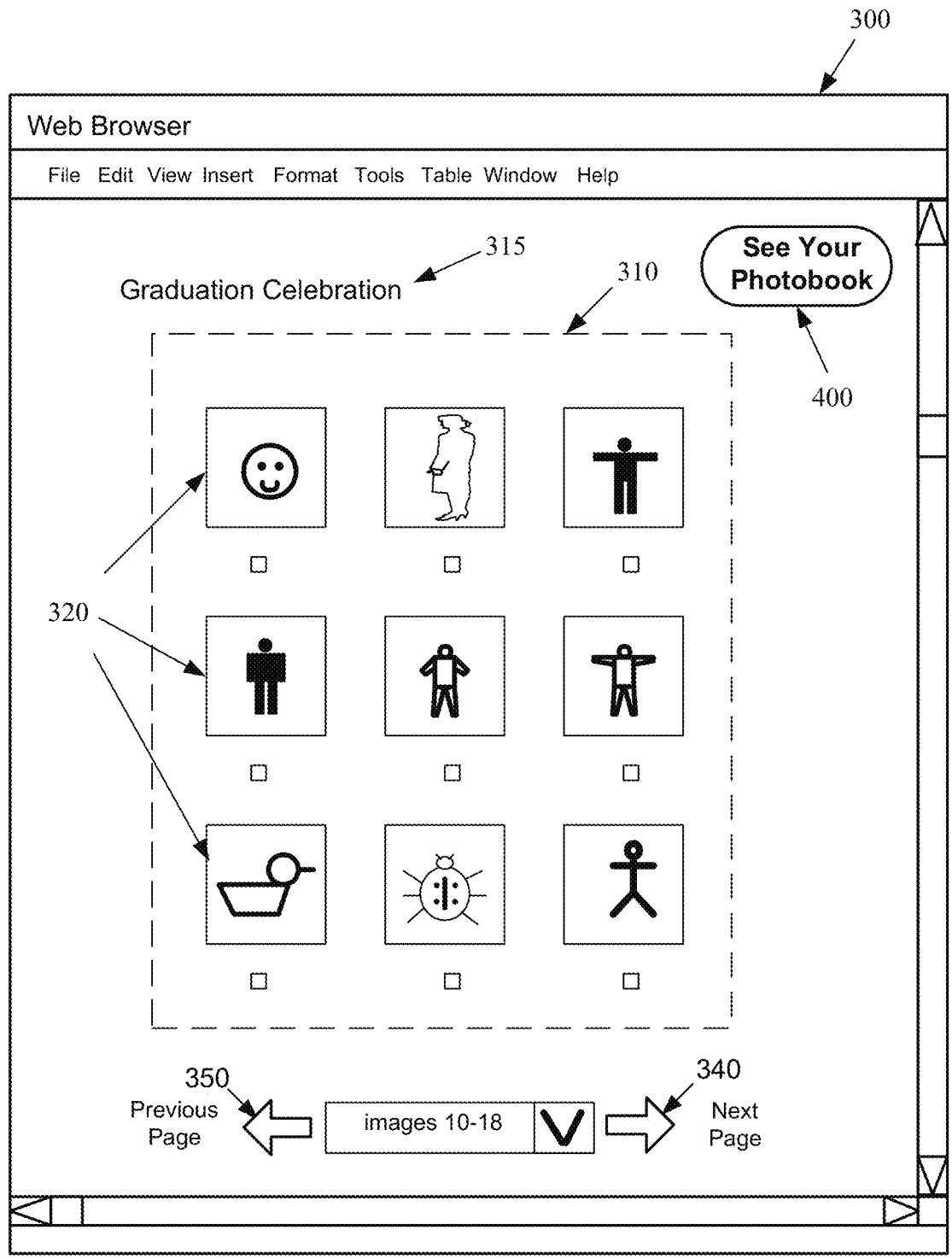
FIG. 4 is an exemplified user interface showing an image album having a plurality of images, and an indication that a photobook has been proactively created.
Figure 5A:
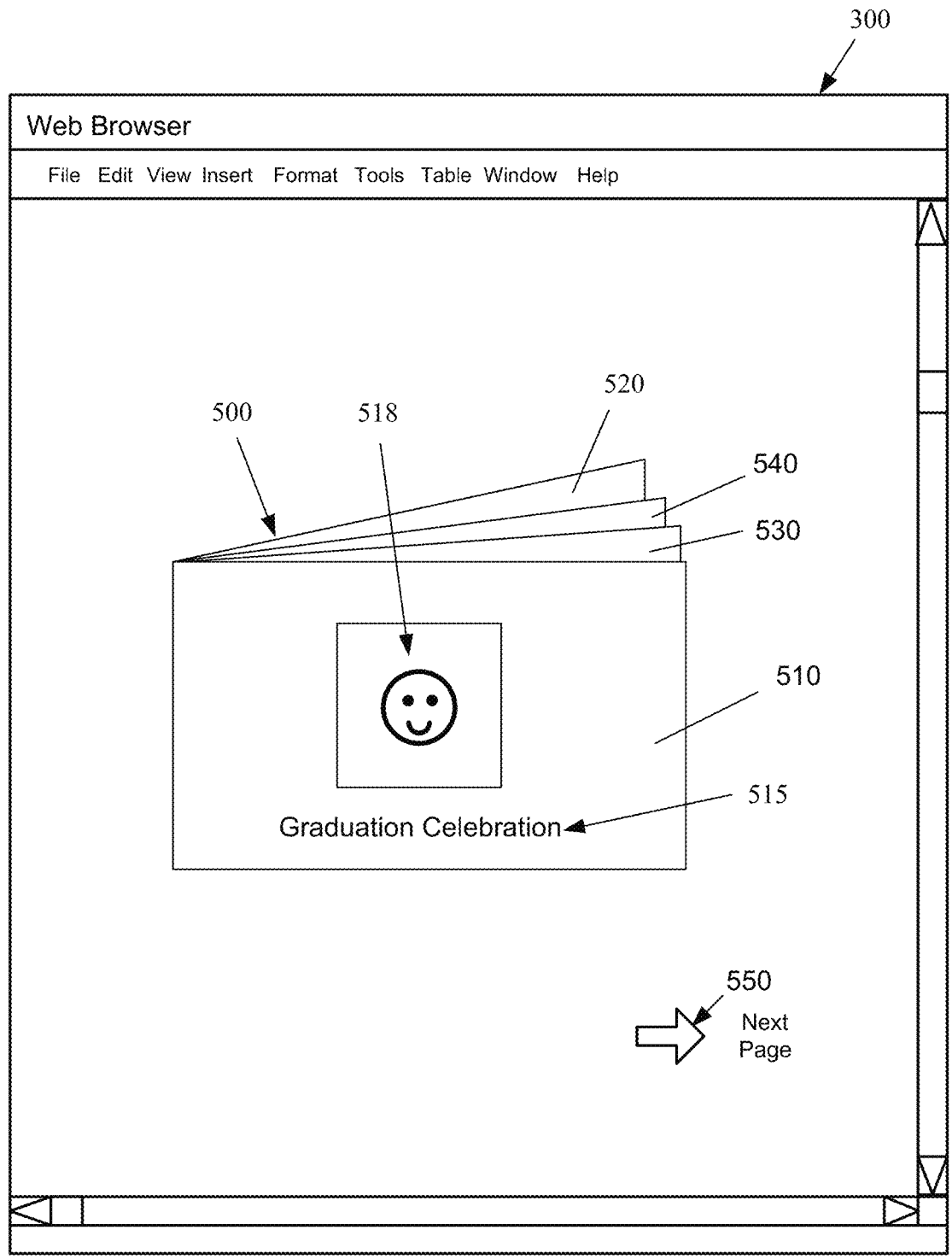
FIGS. 5A and 5B illustrate an exemplified user interface for showing a proactively created photobook.
Figure 5B:
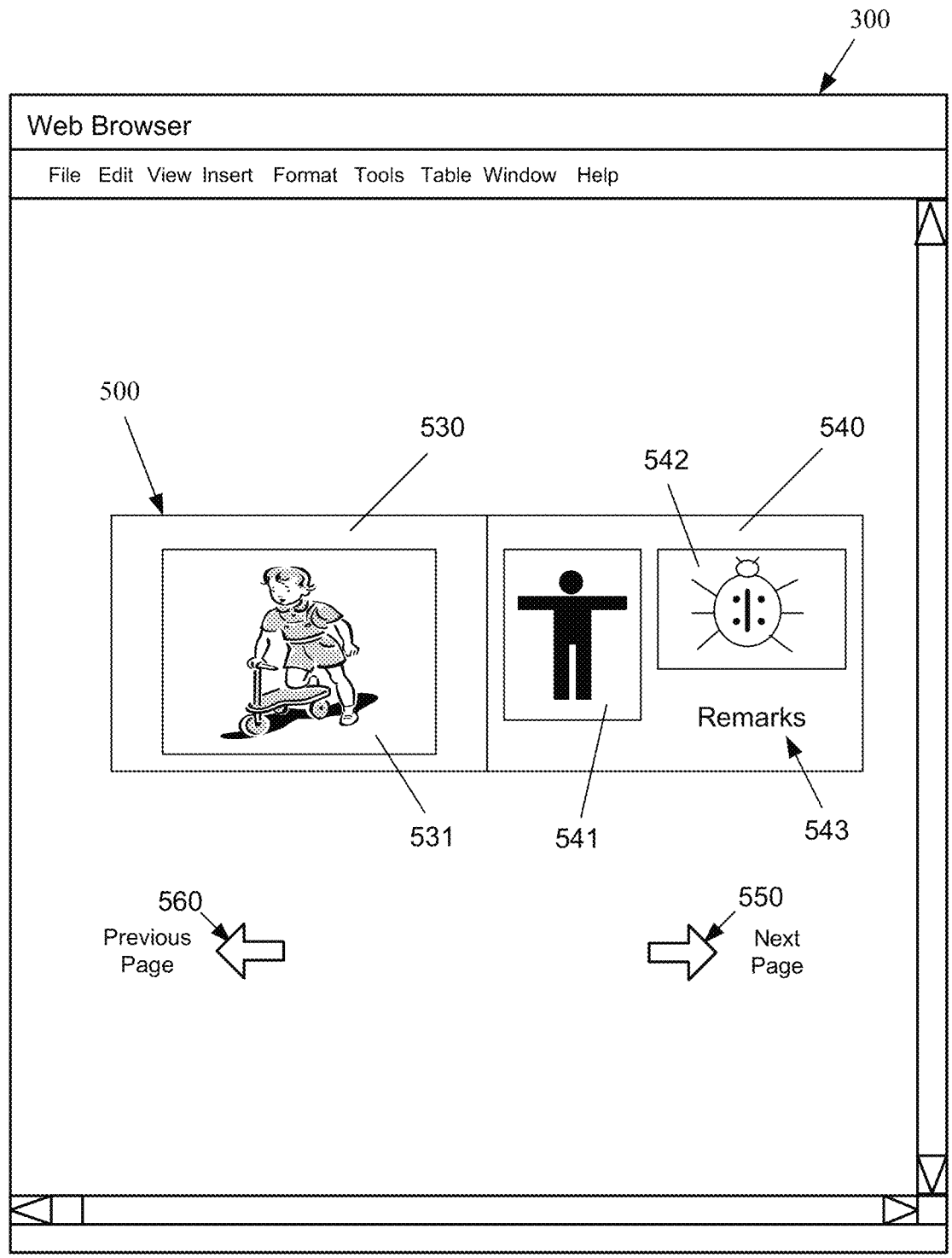

The proactively and automatically created design of the image product such as a photobook can be presented by the computer system to a user for preview (step 250). For example, as shown in FIG. 4, the user interface 300 can display a button 400 "See Your Photobook" to indicate that a photobook based on the images 320 in the image album 310 has been proactively created, and ready for the users view. A photobook design 500 is displayed in the user interface 300 after the user clicks the button 400, as shown in FIGS. 5A and 5B. The photobook can include a front cover 510, a back cover 520, and a plurality of pages 530, 540. The book title can be automatically selected from the name of the image album 310 (FIG. 3). The front cover 510 can include a book title 515 and an image 518 selected from the images 320 (FIG. 3). For example, the image 518 can be the first image in the album 310 or the image used (for a thumbnail image) to represent the image album 310. The page 530 can include an image 531. The page 540 can include images 541, 542, and text 543. The presentation of the photobook design 500 can include realistic illumination and texture to imitate effects of the materials in the selected book format.

The user can click arrow buttons 550, 560 to view different pages of the photobook. The cover and different pages of the photobook design 500 can also be played automatically like a slide show once the user clicks the button 400 (FIG. 4).

Optionally, the user is allowed to edit the design of the image product such as the photobook design 500 (step 260). The user can change, switch, or remove the images 518, 531, 541, and 542 on the book cover 510 and pages 530, 540. The user can also change text information such as the book cover 515 and the text 543. It should be noted that the photobook design 500 represents a complete design of a photobook that is ready to be ordered. The editing is an optional step depending on the user's time availability.

It should be understood that the proactively created designs of the image product can be presented in many forms. As describe above, images identified to create a photobook design typically belong to a group, such as a group of shared images, posted images, uploaded images, or images selected for printing, etc. The proactively created photobook design is presented to the user at relevant places on the web pages, such as on a web page for confirming the share of the group of images, at a share web when the group of shared images are viewed, or at a page after a group of images have been ordered for printing. The image service provider can also proactively send an email to inform someone about the creation of the photobook design. For example, a user that just uploaded a group of images to the server managed by the image service provider may receive an email message from the service provider about the creation of the photobook design.

After the user has reviewed and optionally edited the photobook design 500, the user can save the design of the image product (e.g. the photobook design 500) and order a physical manifestation of the image product (e.g. the photobook) based on the to edit the design of the image product (e.g. the photobook design 500) from the image service provider (step 270).

The image service provider can receive the order via the server 160 and manufacture a physical manifestation of the image product at the printing facility 170 according to the design of the image product (e.g. the photobook design 500) (step 280).

Figure 6:
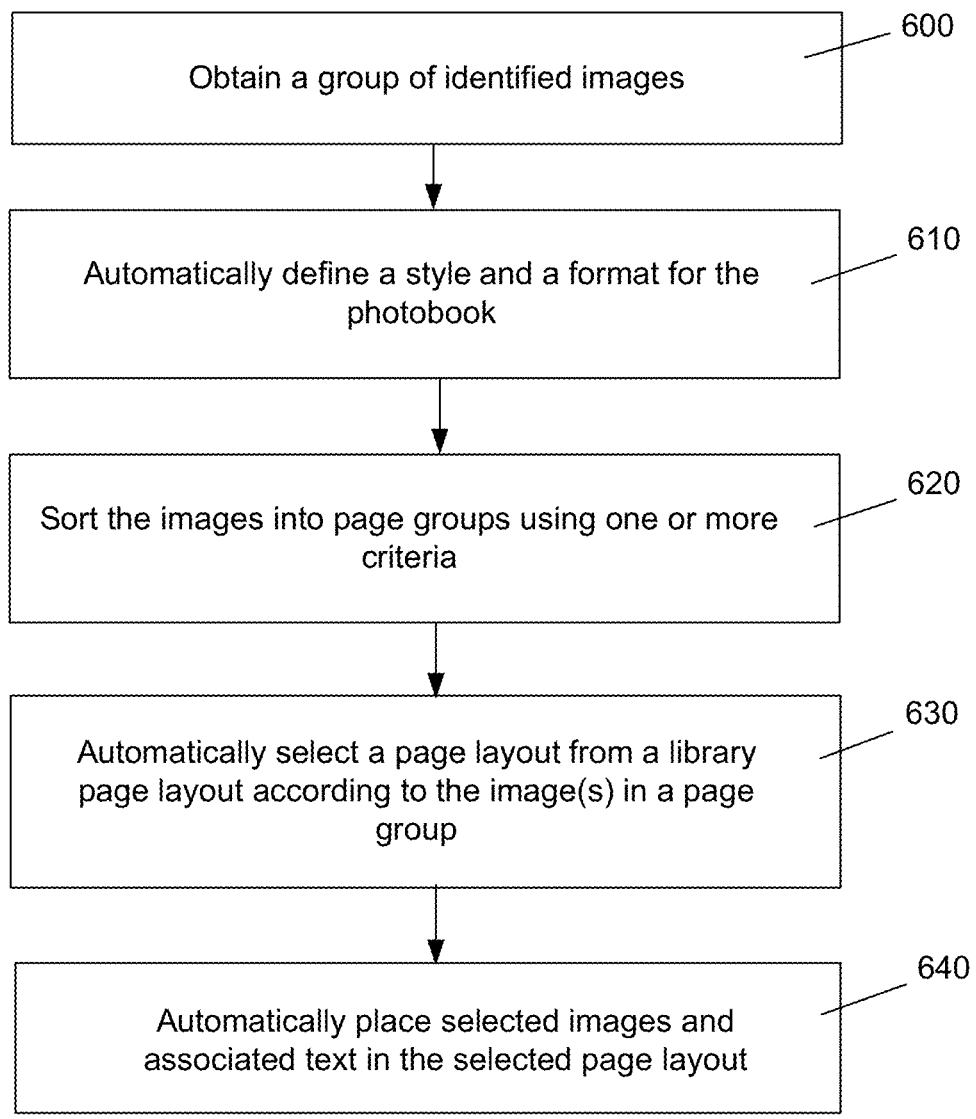
FIG. 6 shows a flow chart for proactively creating a design for a photobook in accordance to the present invention.
Figure 7:
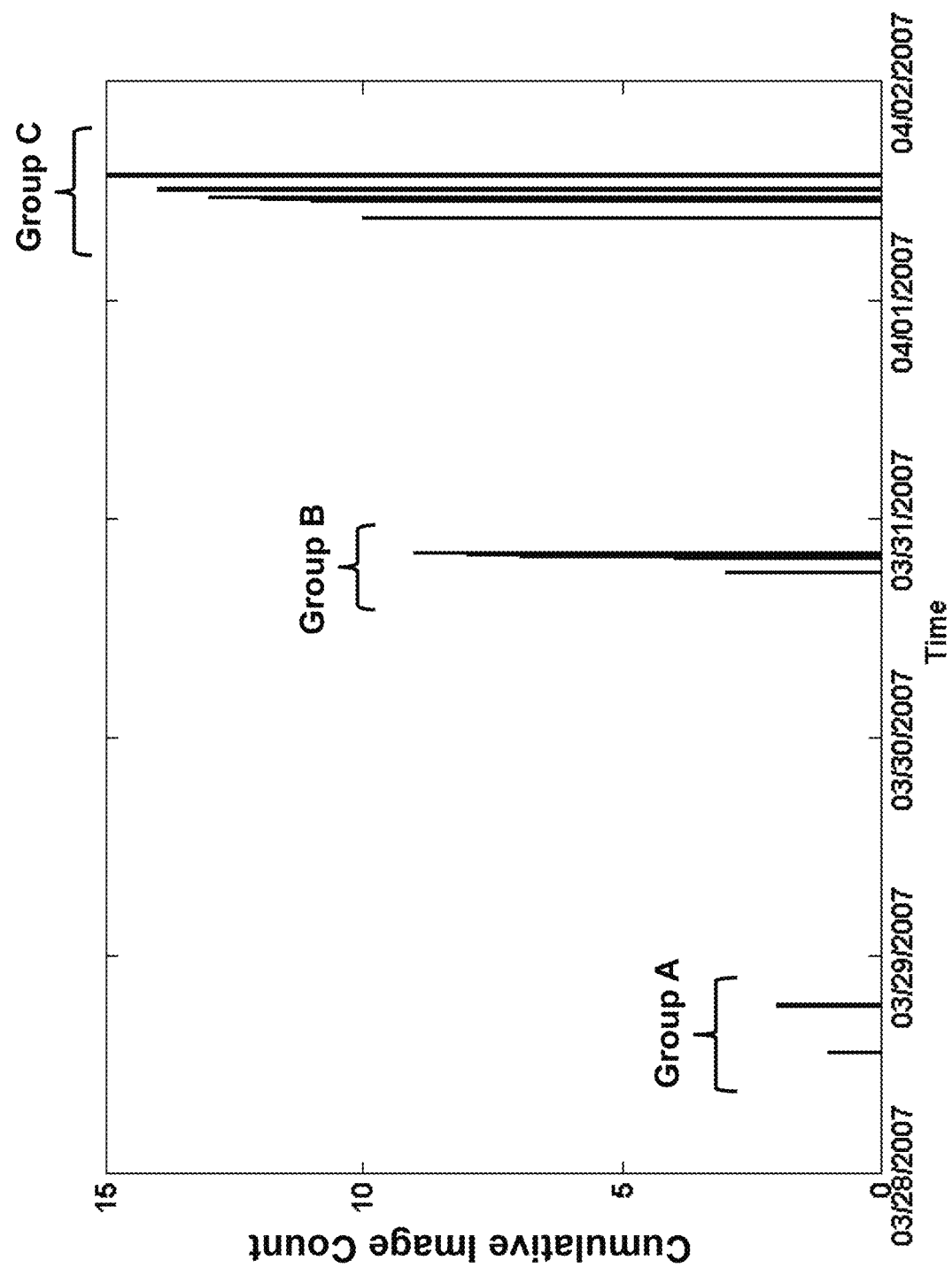
FIG. 7 illustrates sorting and grouping of images by image capture time in accordance to an aspect of the present application.

Details about the proactive design of a photobook (in steps 230-240, FIG. 2) are described below. Referring to FIG. 6, a group of images having numbers within a predetermined range are first obtained as described above by a computer system (step 600). A style and a format can be automatically selected for a photobook design (step 610). The images are sorted by one or more criteria to produce a desirable sequence that the images will be presented in a photo book (step 620). The criteria can include a primary criterion. For example, the images can be sorted by their associated image capture times. The image capture times can be extracted from the header information in the image files. For example, a JPEG image may include an EXIF header that includes the capture time of the image. It is stored in the image file in association with the image data by the digital camera. Referring to FIG. 7, a cumulative image count can be plotted against image capture time. In one implementation, the list of images can be sequenced chronically based on capture time of the images. Users often prefer to have images to appear in book pages in a chronological order. The images can be then separated into page groups using one or more secondary criteria. For example, images can be grouped according to capture time. Images captured in a short time interval are more likely suitable to be placed on the same page, facing pages, or adjacent pages in a photo book. In some embodiments, images that are taken in a short interval (e.g. a day) can be assigned to a same group (e.g. Group A, FIG. 7). The images in Group A, Group B, or Group C (FIG. 7) are captured in a short time interval. The images in each of these groups can be respectively grouped as candidates to appear on a same page, facing pages, or adjacent pages.

Figure 8:
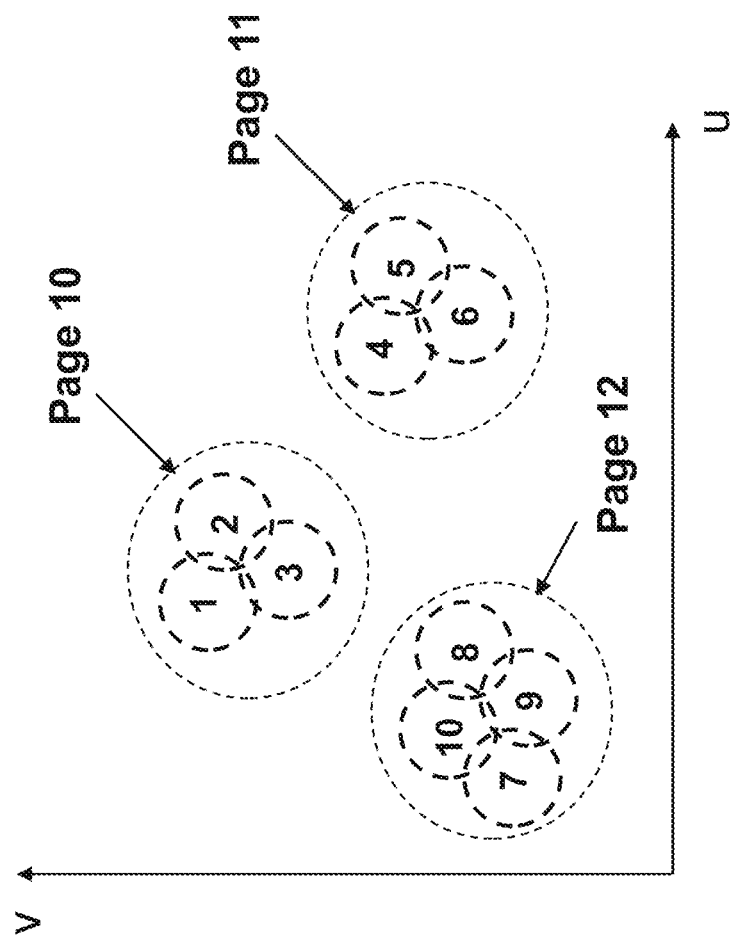
FIG. 8 illustrates sorting and grouping of images by image color content in accordance to another aspect of the present application.

The sorted images may be first placed into a group including a large number of images that do not fit on a page. For example, ten images in Group B (FIG. 7) are taken in a short time interval such a day. The images in Group B can be further separated into page groups using other secondary criteria such as color content and image capture locations. For instance, the most popular color of each of the ten images can be plotted in a color space (such as (Y, u, v), (L, a, b) etc.), as shown in FIG. 8. The color space is first separated into finite number of regions. The most popular color is defined as the color region wherein the most pixel values fall. The ten images can be further sub-grouped according to their adjacencies in the color plane (u, v): images 1-3 may be categorized into a first group; images 4-6 may be categorized into a second group; images 7-10 may be categorized into a third group. The images 1-10 in Group A might have been taken within a same day. The photographer might have traveled to several different surroundings, such as a beach, a restaurant indoor, or a swimming pool at the hotel, each of which may have different color distributions. It should be understood that the display of color content distributions of images are not limited to a specific color coordinates or a two-dimensional color plane shown in FIG. 8. The color distributions can be plotted in three dimensional color spaces (Y, u, v), (L, a, b), or two dimensional color planes such as (Y, u), (Y, v), (a, b), (L, a) etc. In some embodiments, the images with close distance in color space are intentionally separated across different pages in the photobook such as the images on a page will not look alike.

Figure 9:
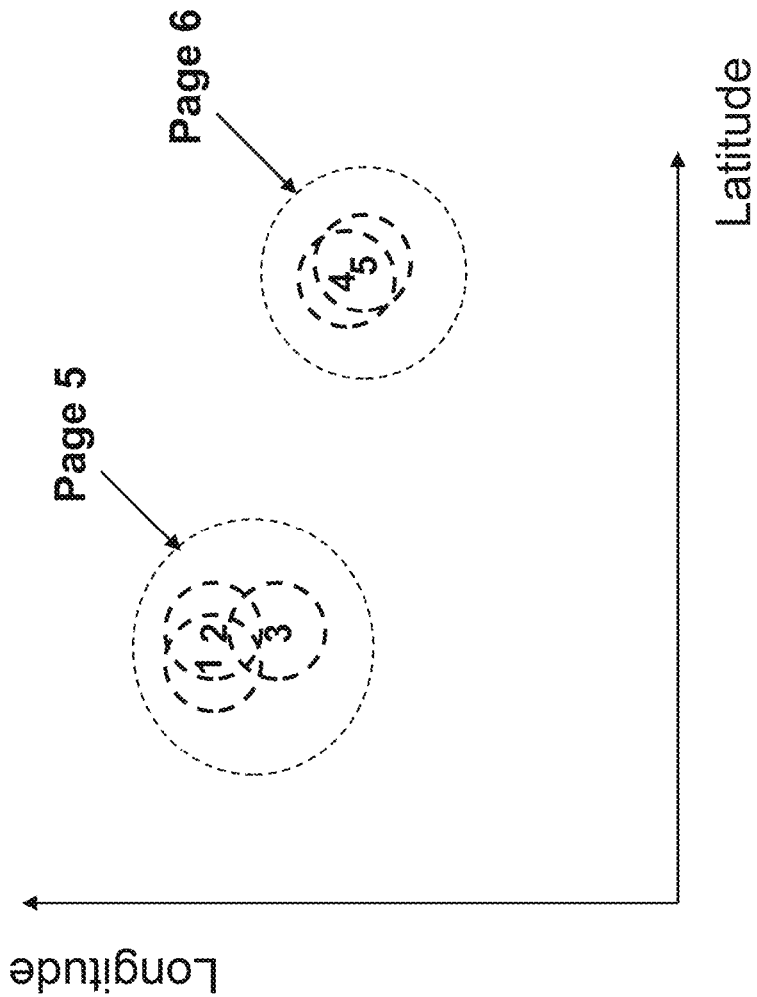
FIG. 9 illustrates sorting and grouping of images by image-capture location in accordance to another aspect of the present application.

In some embodiments, the images can be sorted or grouped based on geographic locations. For example, assuming Group C (FIG. 7) includes five images that are taken, for example, in a same day. Geo location information about each of the five images can be extracted from the header information of the five images, and plotted as shown in FIG. 9. Images 1-3 are taken in close proximity while images 4-5 are taken at similar locations. Images 1-3 can be sub-grouped together and assigned to Page 4 of the photo book. Images 4-5 can be sub-grouped together and assigned to Page 5 of the photo book. In some embodiments, the Images 1-3 and the Images 4-5 can be assigned to be on facing pages (e.g. such as pages 4 and 5) such that the images from the same events can be viewed on facing pages in one open-book view. In some embodiments, the images with close geographic proximity are intentionally separated across different pages in the photobook such as the images on a page will not look alike. The placements of two page groups of images on facing pages can be based on one or more secondary criteria, such as image capture time, image color content, and image capture location.

A page layout is automatically selected from the library of page layouts in accordance with the properties of the images on the page as well as the text information associated with the image receiving areas in the page layout (step 630). The format of the image receiving field in the page layout matches the format of the selected image. For example, images in Group A (FIG. 7) may include two landscape images (L) and two portrait images (P). A notation for the image formats for Group A can be "LLPP". The page layout selected from the page-layout library should have four image receiving areas with matching image formats "LLPP".

The page layout also includes an image caption area positioned adjacent to the image receiving area for receiving the associated text information. For example, one portrait image and one landscape image may be selected for the next page. The portrait image has associated text information entered by the user and stored in conjunction with the portrait image. The landscape image is not associated with any text information. In selecting a page layout, the disclosed system first select page layouts containing two image receiving areas, and then further selects page layouts that have include one portrait and one landscape image receiving areas. Additionally, the disclosed system further selects page layouts that include an image caption area in association with the portrait image receiving area. After the page layout is selected, the selected image(s) and associated text are automatically placed in the selected page layout (step 640). The placement of the selected image(s) and associated text can be done in a single step because they are pre-stored in an integrated data structure as described previously. The same steps can be repeated for fill the image fields and text fields in each page of a photo book. The user can select an image from the plurality of images to be used as part of the book cover. Details about arranging images in page layouts are disclosed in the above referenced commonly assigned U.S. patent application Ser. No. 12/406,873, titled "Smart photobook creation", the content of which is incorporated herein by reference.

Figure 10:
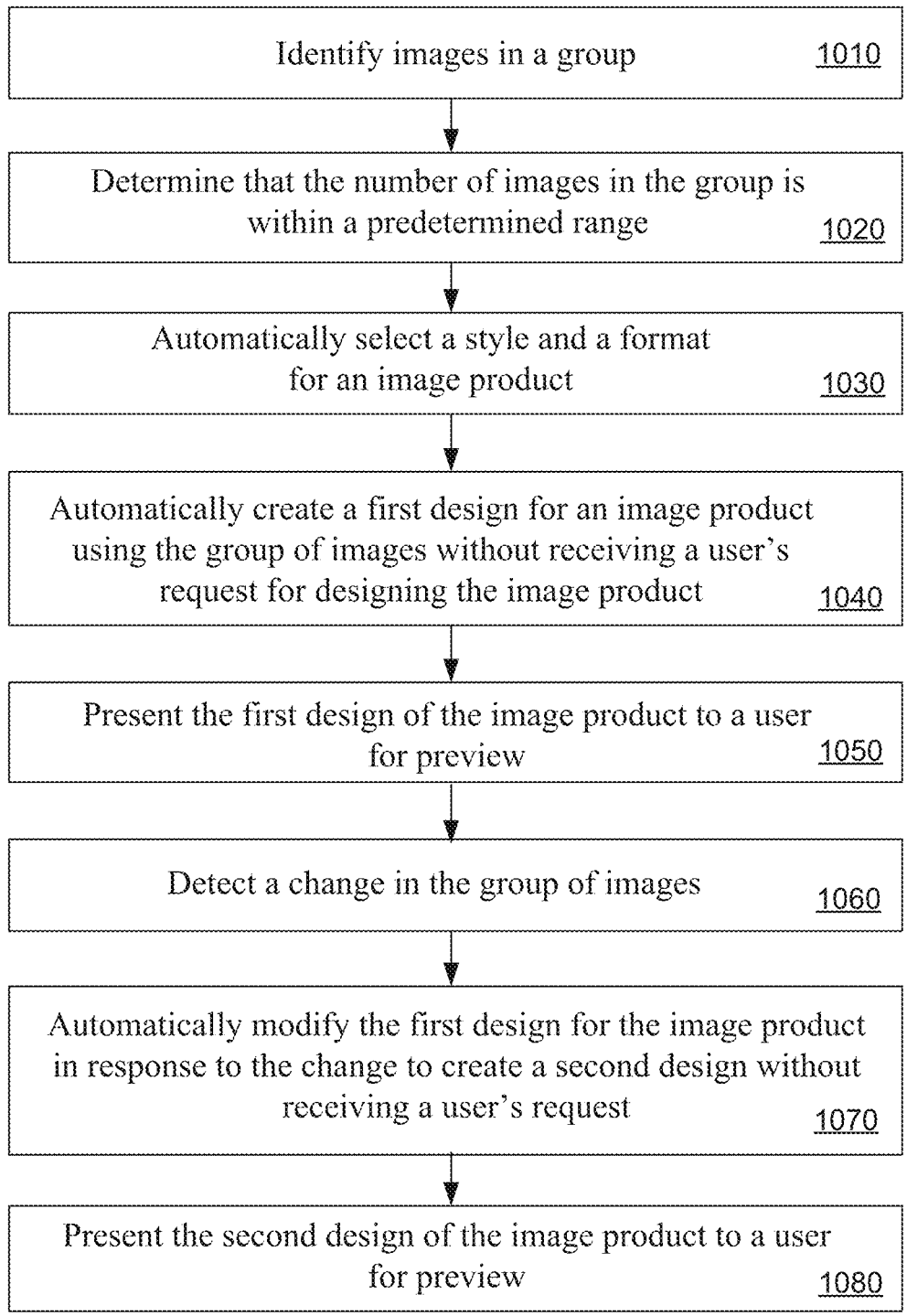
FIG. 10 shows a flow chart for proactively creating an image product in accordance to some embodiments of the present invention.

In some embodiments, the design of an image product can be dynamically changed as the identified images change in the group. For example, the design of the image product can dynamically change as a user adds or removes images in and out of an image album (310, FIG. 3). The number of pages, the number of images per page, and the layout of images on the pages in a photobook, for example, can automatically adapt to the changes to the images identified in the group. In general, the process of updating the design of an image product can include the following steps: similar to the descriptions above in relation to steps 210-250 (FIG. 2), referring to FIG. 10, a group of images is first identified (step 1010). If the number of images in the identified group of images is determined to be in a predetermined range (step 1020), a style and a format are automatically selected for the design of an image product (step 1030). A first design of an image product is automatically created without receiving a request from a user (step 1040). The first design of the image product is made available for the preview by a user (step 1050). When a change is detected in the group of identified images (step 1060), a second design of the image product is automatically created without receiving a request from a user in response to the change detected in the group of images (step 1070). The change in the group of images can include addition to the group of images or removal of images from the group of images. The change in the group of images can also include a change in an image property of the group of images. The image property can include a tag, a keyword, a title of a folder where the images are placed, or metadata at least one of the images.

The second design of the image product is subsequently presented for user's preview (step 1080). The change in the group of identified images can include addition, removal, and a change in the sequence, addition of remarks and keywords, addition in change in tagging in a group of images. The uploading of images into an image folder/album can take more than one uploading events. The design of the image product can be continually updated as new images are received by the image folder/album.

Figure 11:
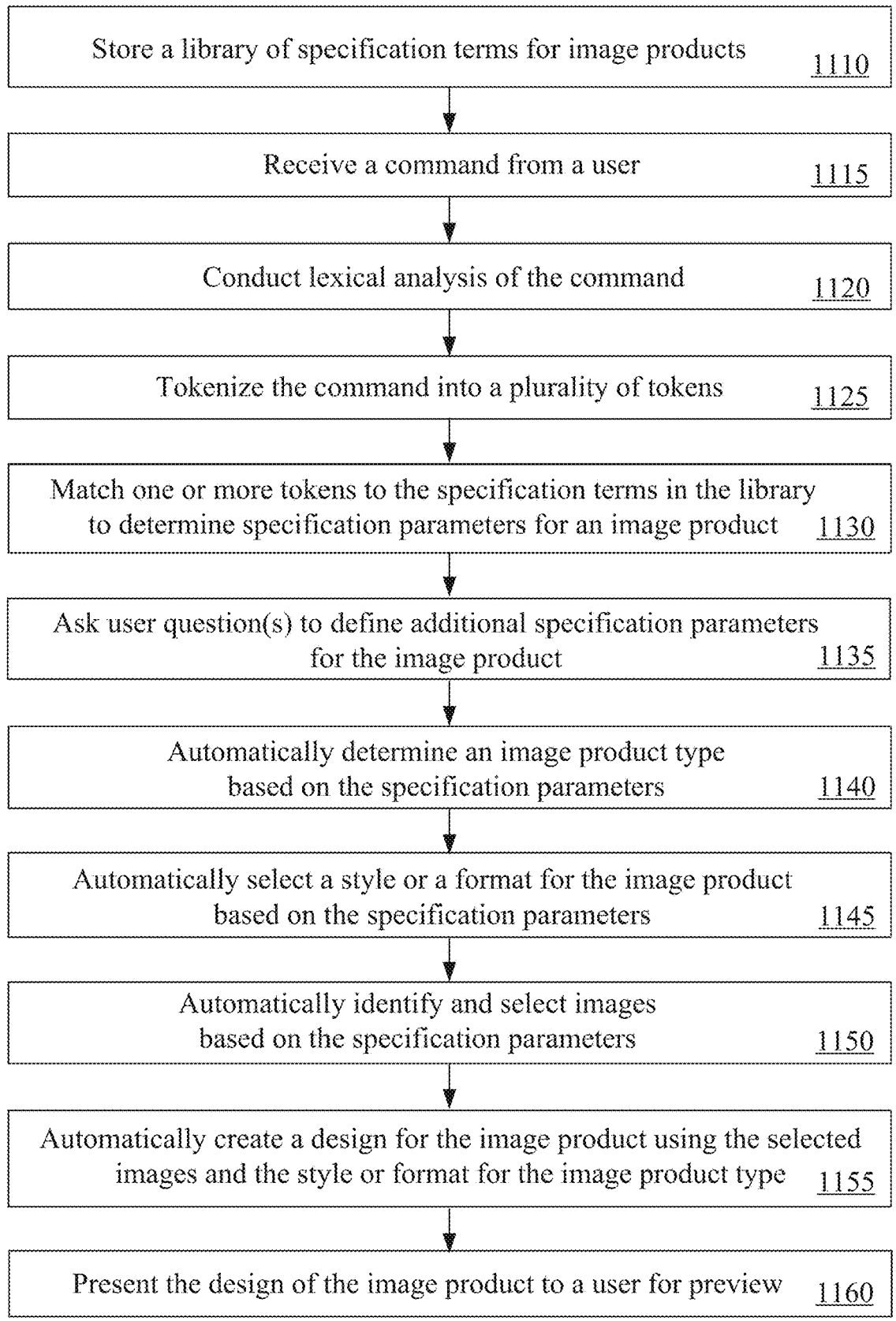
FIG. 11 shows a flow chart for proactively creating an image product in accordance to some embodiments of the present invention.

In some embodiments, referring to FIG. 11, a library of specification terms for image products is stored in a computer system (step 1110). The computer system can include a network based computer system, a user device, a combination thereof, or in other types of configuration. The specification terms cover all necessary information for creating an image product. For example, the specification terms include the names of image products or image services, or the types of image products and services, such as photobook, greeting card, calendar, photo mugs, photo T-shirts, photo aprons, single photo pages, photo collage pages, a photo stationery, photo banners, photo mugs, photo mouse pads, photo key-chains, photo collectors, photo coasters, or a "photo story", phone case, and various photo gifts and photo novelty items, etc. The library can store variations of the specification terms. For example, a photobook can also be referred to as a scrapbook or a book. A greeting card can have different variations such as a photo greeting card, a holiday card, a Christmas card, a birthday card, a Valentine card, an invitation card, a thank you card, an announcement card, a get-well card, etc. Other examples of image products and services are available at websites operated by Shutterfly™, Tinyprints™, MyPublisher™, ThisLife™, etc.

The specification terms can also include contact names or equivalent associated with a user or in a user's address book, which can be stored in the user's computer device or at a central location operated by a service provider. The contact names can include family members, friends, and acquaintances. For example, the person grandma is defined in context of the user. The contact names can also include faces recognized in the user's images stored in the user device(s), at an image service provider such as Shutterfly™, Inc., or at a third party service provider such as Facebook™, Instagram™, etc. In relation to image products, the contact names can be the subjects in the photos to be incorporated in an image product, or the recipients for whom the image product is made.

The specification terms can include time period within which the images are to be selected from. A photobook for the year 2013 usually incorporates images taken in 2013. Unless specified, a holiday card refers to the current holiday season or the holiday season coming up. The specification terms can include occasions for which an image product is to be created, for example, Christmas, wedding, birthday, soccer game, anniversary, vacation, trip to the Caribbean's.

The specification terms can include product styles such as modern, romantic, tropical, or styles developed by designer. The specification terms can include color preferences such as warm, cool, blue, red, green, etc.

The specification terms can define the sources, from which the images will be obtained. For example, the image sources can include user devices such as a phone, a user desktop computer, or a back drive in user's home, image service provider such as Shutterfly™, third party services such as Facebook™, Instagram™, Pinterest™, and cloud storage services such as Amazon™, Google™, Dropbox™, Carbonite™, etc.

The specification terms can include one or more action words in a user command for creating an image product. Examples of action words include "make", "create", "design", "form", "develop", "produce", "order", "buy", etc. These action words are often used at the beginning of a user command, and can be used to clearly identify a user command for creating an image product.

A command is received from a user (step 1115) by the computer system. The command includes a text formed by a string of characters, which can be input by a user, or recognized from a voice message of a user. The user command is typically in a natural language comprising words in a string of characters. Examples for a user command include "Create a photobook for 2013", or "Make a 2014 photo calendar for grandma", or "Make a photobook for Peter's soccer team".

A lexical analysis is conducted on the command (step 1120) by the computer system. The lexical analysis can include parsing or syntactic analysis of the text in the user command. The text string in the user command is tokenized into a plurality of tokens (step 1125).

The tokens obtained from the user command are then matched by the computer system to the specification terms in the library to determine specification parameters for an image product (step 1130). The step of matching can include first converting the tokens to the standard forms to be consistent to the specification terms stored in the library, which can include removing the article the" or "a" in the front of a token, simplifying plural to a singular form, identifying synonyms or morphological variations of a standard term and converting them to standard forms. The step of matching then involves matching the tokens in their standard forms to the specification terms in the library.

The matched specification terms can determine specification parameters for an image product. For example, tokens "photobook" and "2013" in the user command "Create a photobook for 2013" define a photobook that include photos taken in the year 2013. These action words such as "make" or "create" can be used to identify a user command for creating an image product.

Optionally, the user can be asked by question(s) by the computer system to define additional specification parameters for the image product (step 1135). For example, in the user command "Create a photobook for 2013", the additional question can include "For whom the photobook will be made?" or "Is the photobook for the family?" (i.e. "will only photos of family members be included?"). Some messages like "Create a photobook" or "Make a birthday card" do not provide sufficient information to specify an image product. The computer system can prompt question to the user to clarify information such as the time period, the subject in the photos of the photobook, whose birthday the card is for, from whom, etc. User's answers to these additional questions are analyzed similar to the original user command in steps 1115-1130 above.

An image product type is automatically determined by the computer system based on the matched specification parameters that correspond to a product type such as "photobook" or "birthday card" in the library (step 1140).

Additionally, a style or a format for the image product can be automatically selected based on the specification parameters (step 1145). For example, if the user command or user answers to questions include "8 by 8 inch photobook", "wedding book", "folded greeting card", or "two piece iPhone 5s case", an 8"×8" photobook, a premium wedding style photobook, a 5"×7" folded greeting card, and a two-piece phone case for iPhone 5s can be respectively selected automatically.

Images are automatically identified and selected based on the specification parameters (step 1150), which can include several sub-steps.

First, images may be evaluated in a subset of or all available image sources. If a user command such as "Create a photobook for 2013" does not specify the sources of the images the image product is to incorporate, the images satisfying the criteria (e.g. taken in 2013) from all available image sources can be evaluated. Alternatively, the user command or answer may include image source specifications such as "Create a photobook for 2013 using pictures in my Shutterfly account", or "Create a photobook for 2013 with photos from Shutterfly, Facebook, and Instagram". Images will be retrieved and evaluated in the specified image sources. As described above, image sources can include the image sources can include user devices such as a phone, a user desktop computer, or a back drive in user's home, image service provider such as Shutterfly™, third party services such as Facebook™, Instagram™, Pinterest™, and cloud storage services such as Amazon™, Google™, Dropbox™ Carbonite™, etc.

Secondly, the automatic identification and selection of images can be based on the person(s) and the subject defined in the specification parameters (i.e. matched specification terms). For example, if the image product to be made is a family photobook or to be given to Grandma, only photos of family members (potentially with emphases on grand children) will be first selected. The person(s) in the photos can be identified using tags or keywords associated with the photos or faces recognized in the photos. In another example, if a user command recites "a photobook for Hawaii vacation", then the photos taken in Hawaii will be first selected for evaluation. The photo capture location or vacation can be determined using geo location tag, keywords, and album names in association with the photos.

Next, the images identified in the (designated) image sources are ranked based on predetermined criteria such as image quality, relevance, colors, orientation, format, and similarity among images, etc. For example, a photo that is fuzzy or of low resolution has lower image quality. The ranking can produce ranking values for the images. Details for ranking images for image products and services are also disclosed in commonly assigned U.S. Pat. No. 7,467,222, the disclosure of which is incorporated herein by reference.

The images are then selected based on the ranking. Higher ranked images are selected. Lower quality and less relevant images are discarded. Similar or redundant photos can be trimmed. Similar to what is described previously in relation to FIG. 2 (step 220) and FIG. 10 (step 1020), the number of images selected is dependent on the type of image product to be created. In other words, a subset of the identified images are selected comprising an image number within a predetermined range compatible with the image product type For example, a 12 month book calendar typically includes a cover photo, and 1-5 photos per month so the total number of images can be limited to less than 60, such as 30. A photobook on the hand should at least include 20 images. A Christmas card typically includes less than six photos, and most commonly, only one photo.

With product type, format, style and image selected, a design for the image product is automatically created using the selected images and the style or format for the image product type (step 1155). The layout of the images in the image product can be determined capture times, geo locations, image properties (color, density, sharpness, tone scale, image quality, etc.). Examples of automatic image layout in image products are described above in association with FIGS. 7-9.

The design of the image product can be presented to a user for preview (step 1160). The presentation can be made at a web user interface such as in a web browser, in a mobile application, or in a design file, etc. The user can be allowed to edit and enter additional information such as book title and captions within the pages. The user can decide to order an image product based the image product design, or share the image product design.

The recipient for which the image product is created can be defined by the specification parameters obtained in the step of matching (step 1130). For example, after being manufactured, a photobook made for grandma is shipped to the grandma (the role of grandma is defined in the context of the user).

In some embodiments, as mentioned above in step 1115, the automated creation of personalized products can be initiated or triggered by the recognition of certain voice messages. These voice messages can include explicit user commands for the interest or the need for personalized products. In some cases, users' intentions or potential needs for personalized products can be inferred from one or more voice messages.

Figure 12:
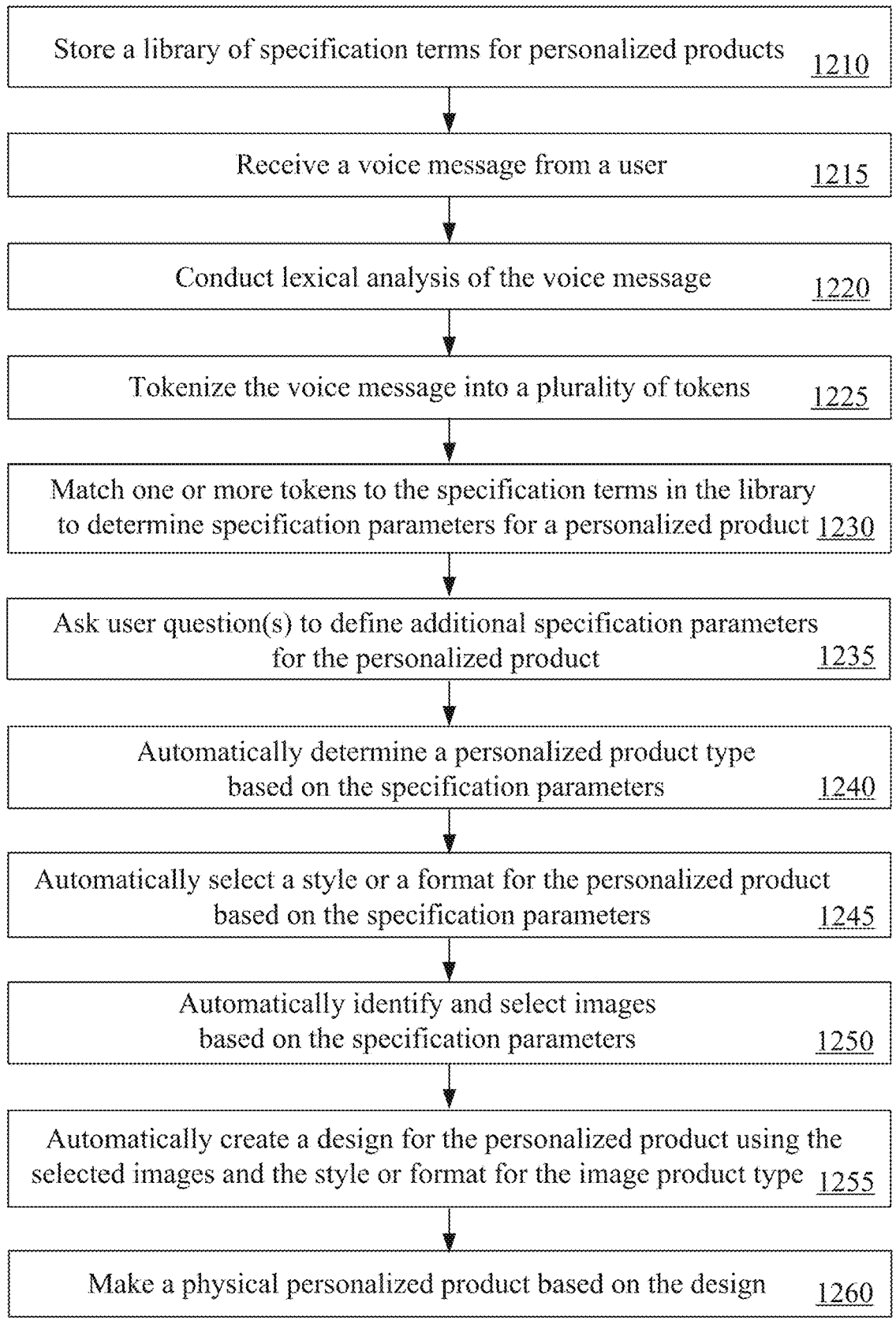
FIG. 12 shows a flow chart for proactively creating an image product in accordance to some embodiments of the present invention.

Referring to FIG. 12, a library of specification terms for personalized products is stored in a computer system (step 1210). The computer system can include a network based computer system, a user device, a combination thereof, or in other types of configuration. The specification terms cover all necessary information for creating a personalized product. For example, the specification terms include the names of personalized products or image services, or the types of personalized products and services, such as photobook, greeting card, calendar, photo mugs, photo T-shirts, photo aprons, single photo pages, photo collage pages, a photo stationery, photo banners, photo mugs, photo mouse pads, photo key-chains, photo collectors, photo coasters, or a "photo story", phone case, and various photo gifts and photo novelty items, etc. The library can store variations of the specification terms. For example, a photobook can also be referred to as a scrapbook or a book. A greeting card can have different variations such as a photo greeting card, a holiday card, a Christmas card, a birthday card, a Valentine card, an invitation card, a thank you card, an announcement card, a get-well card, etc. Other examples of personalized products and services are available at websites operated by Shutterfly™, Tinyprints™, MyPublisher™, ThisLife™, etc.

The specification terms can also include contact names or equivalent associated with a user or in a user's address book, which can be stored in the user's computer device or at a central location operated by a service provider. The contact names can include family members, friends, and acquaintances. For example, the person grandma is defined in context of the user. The contact names can also include faces recognized in the user's images stored in the user device(s), at an image service provider such as Shutterfly™, Inc., or at a third party service provider such as Facebook™, Instagram™, etc. In relation to personalized products, the contact names can be the subjects in the photos to be incorporated in a personalized product, or the recipients for whom the personalized product is made.

The specification terms can include a time period within which the images are to be selected. A photobook for the year 2013 usually incorporates images taken in 2013. Unless specified, a holiday card refers to the current holiday season or the holiday season coming up. The specification terms can include occasions for which a personalized product is to be created: for example, Christmas, wedding, birthday, soccer game, anniversary, vacation, trip to the Caribbean's.

The types of personalized product can include photobooks, personalized greeting cards, photo stationeries, photo or image prints, photo posters, photo banners, photo playing cards, photo T-shirts, photo mugs, photo aprons, or magnets, mouse pads, phone cases, cases for tablet computers, keychains, photo collectors, coasters, banners, or other types of photo gifts that include personalized content. Other examples of personalized products include glassware, tiles, woodwork, jewelry trays, paperweights, pillows, and mugs that include customizable graphic designs, text, or images.

The specification terms can include product styles such as modern, romantic, tropical, or styles developed by designer. The specification terms can include color preferences such as warm, cool, blue, red, green, etc.

The specification terms can define the sources from which the images will be obtained. For example, the image sources can include user devices such as a phone, a user desktop computer, or a back drive in user's home, image service provider such as Shutterfly™, third party services such as Facebook™, Instagram™, Pinterest™, and cloud storage services such as Amazon™, Google™, Dropbox™, Carbonite™, etc.

The specification terms can include one or more action words in one or more voice messages from a user, which are related to a personalized product. Examples of action words include "make", "create", "design", "form", "develop", "produce", "order", "buy", etc. These action words are often used at the beginning of a voice message, and can be used to clearly identify a voice message for creating a personalized product.

A voice message is received from a user (step 1215) by the computer system. The computer system can include a computer (100 in FIG. 1), a mobile phone, a tablet computer, a desktop computer connected to an image capture device, other computer or mobile communication devices, or a computer network with one or more terminals. The voice message can be received by a microphone (e.g. 106 in FIG. 1) that can be integrated in a computer device (such as a mobile phone, a tablet computer, laptop computer, etc.) or connected to a computer device as a peripheral device.

The voice message was first received as an analog audio signal by the microphone, and converted to a digital signal in the I/O unit (117 in Figure). The voice message is typically in a natural language comprising words in a string of characters. The voice in the voice message in the digital form is recognized, and converted into a text. Examples for a voice message include "Create a photobook for 2013", or "Make a 2014 photo calendar for grandma", "Make a photobook for Peter's soccer team", "Create mug with the last photo", "Make holiday card using Christmas photos", "Create a photobook from Hawaii album", "Make notepad for Katie", "Make poster print from team photo", "Create magnets using Tang Family photo", "Make cards using Favorite photos (from phone photo album)", or "Add selected photos to vacation photobook".

A lexical analysis is conducted on the voice message (step 1220) by the computer system. The lexical analysis can include parsing or syntactic analysis of the text in the voice message. The text string in the voice message is tokenized into a plurality of tokens (step 1225).

The tokens obtained from the voice message are then matched by the computer system to the specification terms in the library to determine specification parameters for a personalized product (step 1230). The step of matching can include first converting the tokens to the standard forms to be consistent to the specification terms stored in the library, which can include removing articles "the" or "a" in the front of a token, simplifying plural to a singular form, identifying synonyms or morphological variations of a standard term and converting them to standard forms. The step of matching then involves matching the tokens in their standard forms to the specification terms in the library.

The matched specification terms can determine specification parameters for a personalized product. For example, tokens "photobook" and "2013" in the voice message "Create a photobook for 2013" define a photobook that include photos taken in the year 2013. Some voice messages are in command style and can include action words such as "make" or "create", which can be used to identify a voice message for creating a personalized product.

Optionally, the user can be asked by question(s) by the computer system to define additional specification parameters for the personalized product (step 1235). Some messages such as "Create a photobook" or "Make a birthday card" do not provide sufficient information to specify a personalized product. The computer system can either automatically set parameters such as time period and the recipient or audience that is the photobook is for, or can prompt question to the user to clarify information such as the time period, the subject in the photos of the photobook, whose birthday the card is for, from whom, etc.). For example, in response to a voice message "Create a photobook for 2013", additional questions such as "For whom the photobook will be made?" or "Is the photobook for the family?" can be presented to the user. User's answers to these additional questions are analyzed similar to the original voice message in steps 1215-1230 above.

A personalized product type is automatically determined by the computer system based on the matched specification parameters that correspond to a product type such as "photobook" or "birthday card" in the library (step 1240).

Some voice messages may not include a command for making personalized products, but their content can be used to infer the potential needs for personalized products. For example, if the voice message relates to planning for a dinner out celebrating a spouse's birthday, the computer system can infer the need for a birthday card or a personalized present, which in turn triggers the selections of a product type, content (e.g. personal photos), style or theme, and delivery time, etc. If voice messages include discussions about a wedding, graduation, vacation, a ball game, etc., personalized products related to these events can be automatically selected (step 1240).

Additionally, a style or a format for the personalized product can be automatically selected based on the specification parameters (step 1245). For example, if the voice message or user answers to questions include "8 by 8 inch photobook", "wedding book", "folded greeting card", or "two piece iPhone 5s case", these photo products can be respectively selected automatically.

Images are automatically identified and selected based on the specification parameters (step 1250), which can include several sub-steps.

First, images may be evaluated in a subset of or all available image sources. If a voice message such as "Create a photobook for 2013" does not specify the sources of the images the personalized product is to incorporate, the images satisfying the criteria (e.g. taken in 2013) from all available image sources can be evaluated. Alternatively, the voice message or answer may include image source specifications such as "Create a photobook for 2013 using pictures in my Shutterfly account", or "Create a photobook for 2013 with photos from Shutterfly, Facebook, and Instagram". Images will be retrieved and evaluated in the specified image sources. As described above, image sources can include the image sources can include user devices such as a phone, a user desktop computer, or a back drive in user's home, user accounts at image service provider such as Shutterfly™, third party services such as Facebook™, Instagram™, Pinterest™, and cloud storage services such as Amazon', Google™, Dropbox™, Carbonite™, etc.

Secondly, the automatic identification and selection of images can be based on the person(s) and the subject defined in the specification parameters (i.e. matched specification terms). For example, if the personalized product to be made is a family photobook or to be given to Grandma, only photos of family members (potentially with emphases on grand children) will be first selected. The person(s) in the photos can be identified using tags or keywords associated with the photos or faces recognized in the photos. In another example, if a voice message recites "a photobook for Hawaii vacation", then the photos taken in Hawaii will be first selected for evaluation. The photo capture location or vacation can be determined using geo location tag, keywords, and album names in association with the photos.

Next, the images identified in the (designated) image sources are ranked based on predetermined criteria such as image quality, relevance, colors, orientation, format, and similarity among images, etc. For example, a photo that is fuzzy or of low resolution has lower image quality. The ranking can produce ranking values for the images. Details for ranking images for personalized products and services are also disclosed in commonly assigned U.S. Pat. No. 7,467,222, the disclosure of which is incorporated herein by reference.

The images are then selected based on the ranking. Higher ranked images are selected. Lower quality and less relevant images are discarded. Similar or redundant photos can be trimmed. Similar to what is described previously in relation to FIG. 2 (step 220) and FIG. 10 (step 1020); the number of images selected is dependent on the type of personalized product to be created. In other words, a subset of the identified images are selected comprising an image number within a predetermined range compatible with the personalized product type For example, a 12 month book calendar typically includes a cover photo, and 1-5 photos per month so the total number of images can be limited to less than 60, such as 30. A photobook on the hand should at least include 20 images. A Christmas card typically includes less than six photos, and most commonly, only one photo.

With product type, format, style and image selected, a design for the personalized product is automatically created using the selected images and the style or format for the personalized product type (step 1255). The layout of the images in the personalized product can be determined capture times, geo locations, image properties (color, density, sharpness, tone scale, image quality, etc.). Examples of automatic image layout in personalized products are described above in association with FIGS. 7-9.

The design of the personalized product is optionally presented to a user for preview. The presentation can be made at a web user interface such as in a web browser, in a mobile application, or in a design file, etc. The user can be allowed to edit and enter additional information such as book title and captions within the pages. The user can decide to order a personalized product based the personalized product design, or share the personalized product design. The displaying step for the design of the personalized product can include the creation and the rendering of a three-dimensional model for the personalized product including all the personalized content such as the selected photo, personalized design elements, text or a logo. The three-dimensional model is the personalized product can be displayed in perspective views on the device.

The user can review the personalized product at a user interface and order it to be made into a physical product. A physical product can be manufactured at a manufacturing facility (e.g. 170, FIG. 1) based on the design of the personalized product (step 1260).

The recipient for which the personalized product is created can be defined by the specification parameters obtained in the step of matching (step 1230). For example, after being manufactured, a photobook made for grandma is shipped to the grandma (the role of grandma is defined in the context of the user).

The design of the personalized product of the product type incorporating the selected photo can optionally be electronically shared share to another device. The second device can for example be operated by a friend or family friend of the first user. The share can be initiated by the first user who likes the design after preview and decides to share it with his or her family member of friend. The electronic share can be conducted over a wired or wireless computer network, a local network, an intranet, or the Internet. The design of the personalized product incorporating the selected photo can be automatically displayed on the second device.

An advantage of the above-disclosed methods is that the users do not need to go through a lengthy process to create a personalized image product as in the convention systems. Another advantage of the above-disclosed methods is that personalized products are automatically created by recognizing voice messages without user input via a touch screen or a keyboard.

What is claimed is:

1. A computer system for proactively creating an image product, comprising:
   a computer memory configured to store a library of specification terms for image products;
   an I/O unit configured to receive a voice message from a user; and
   a computer processor in communication with the I/O unit and the computer memory, wherein the computer processor is configured to convert the voice message into a text form, to conduct lexical analysis of the text, tokenize the text into a plurality of tokens by the computer system, match one or more of the tokens to the specification terms in the library to determine specification parameters for an image product, automatically identify images based on the specification parameters, and to automatically create a design for the image product that incorporates at least some of the images identified based on the specification parameters.

2. The computer system of claim 1, wherein the specification terms in the library specify one or more image sources from which the images are to be obtained, wherein one or more of the tokens are matched to the specification terms in the library that specify the one or more image sources, wherein the computer processor is further configured to automatically identify comprises identifying images at the one or more image sources.

3. The computer system of claim 1, wherein the specification terms in the library specify one or more persons, wherein one or more of the tokens are matched to the specification terms in the library that specify one or more persons, wherein the computer processor is further configured to automatically identifying comprises identifying images that include the one or more persons in the images.

4. The computer system of claim 1, wherein the specification terms in the library specify an occasion that the images are associated with, wherein one or more of the tokens are matched to the specification terms in the library that specify an occasion, wherein the computer processor is further configured to automatically identify comprises identifying images that are associated with the occasion.

5. The computer system of claim 1, wherein the specification terms in the library specify a time period in which the images are taken, wherein one or more of the tokens are matched to one or more specification terms in the library that specify a time period in which the images are taken, wherein the computer processor is further configured to automatically identify comprises identifying images that are taken in the time period.

6. The computer system of claim 1, wherein the specification terms in the library specify one or more image product types, wherein one or more of the tokens are matched to at least one specification term in the library that specifies an image product type, wherein the design for the image product is automatically created in the image product type.

7. The computer system of claim 1, wherein the computer processor is further configured to select a subset of the identified images, wherein a number of the identified images in the subset is within a predetermined range compatible with the image product type.

8. The computer system of claim 1, wherein the specification terms in the library specify a style or a format for an image product, wherein one or more of the tokens are matched to at least one specification term in the library that specifies a style or a format for an image product, wherein the design for the image product is automatically created in the style or the format.

9. The computer system of claim 1, wherein the computer processor is further configured to design to a manufacturing facility in which a physical manifestation of the image product manufactured based on the design for the image product.

10. The computer system of claim 9, wherein the specification terms in the library specify a recipient for an image product, wherein one or more of the tokens are matched to a specification term in the library that specifies a recipient for an image product, wherein the physical manifestation of the image product is sent to the recipient.

11. The computer system of claim 1, wherein the computer processor is further configured to rank the identified images using predetermined criteria to produce a ranking result, and select a subset of the identified images based on the ranking result, wherein the design for the image product incorporates the subset of the identified images.

12. The computer system of claim 1, wherein the computer processor is further configured to present a question to the user after the one or more of the tokens are matched to the specification terms in the library, to receive an answer from the user, to tokenize the answer into a plurality of tokens, and to match one or more of the tokens to the specification terms in the library to determine additional specification parameters for an image product.

13. The computer system of claim 1, wherein the computer processor is further configured to assign at least a portion of the identified images into a first page group and a second page group each comprising one or more images, to place the first page group of one or more images in the first page of the image product, and to place the second page group of one or more images in the second page of the image product.

14. The computer system of claim 1, wherein the computer processor is further configured to conduct parsing or syntactic analysis of the text when lexical analysis is conducted on the text.

15. The computer system of claim 1, wherein the computer processor is further configured to conduct parsing the text when the text is tokenized.

16. The computer system of claim 1, wherein the computer processor is further configured to match the one or more of the tokens to morphological variations of the specification terms in the library to determine specification parameters for an image product.

\* \* \* \* \*